United States Patent [19]
Scobie et al.

[11] Patent Number: 4,649,949
[45] Date of Patent: Mar. 17, 1987

[54] FIREPROOF VALVE ASSEMBLY AND SEAL ELEMENT FOR USE THEREIN

[75] Inventors: William B. Scobie; Michael L. Wagberg, both of Houston, Tex.

[73] Assignee: Keystone International, Inc., Houston, Tex.

[21] Appl. No.: 836,542

[22] Filed: Mar. 5, 1986

[51] Int. Cl.⁴ .............................................. F16K 17/14
[52] U.S. Cl. ........................................ 137/67; 137/74; 251/306; 251/317
[58] Field of Search .................... 137/67, 72, 74, 75; 251/306, 316, 317, 308

[56] References Cited

U.S. PATENT DOCUMENTS 3,544,066 12/1970 Fawkes ............................... 251/306
3,904,111 9/1975 Peterson ......................... 137/67 UX
4,072,159 2/1978 Kurosawa ............................. 137/67

Primary Examiner—Harold W. Weakley
Attorney, Agent, or Firm—Browning, Bushman, Zamecki & Anderson

[57] ABSTRACT

A valve assembly comprising a valve housing defining an internal valve cavity and a fluid flow passageway, a valve element rotatably received in the valve cavity to control flow through the passageway, one of the valve housing or the valve element defining a seating surface, the other defining a seal member carrying surface, and a seal member carried on the seal member carrying surface on either the valve housing or the valve element for engaging the seating surface and effecting a seal between the valve using the valve element, the seal member being comprised of an intumescent material.

15 Claims, 6 Drawing Figures

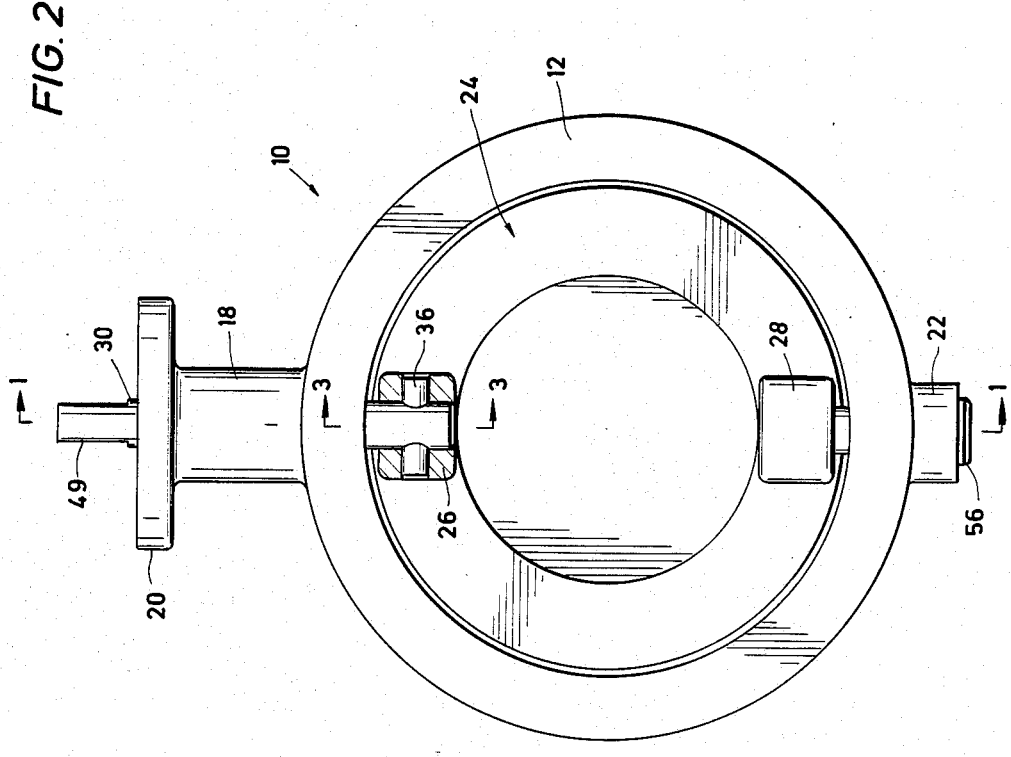
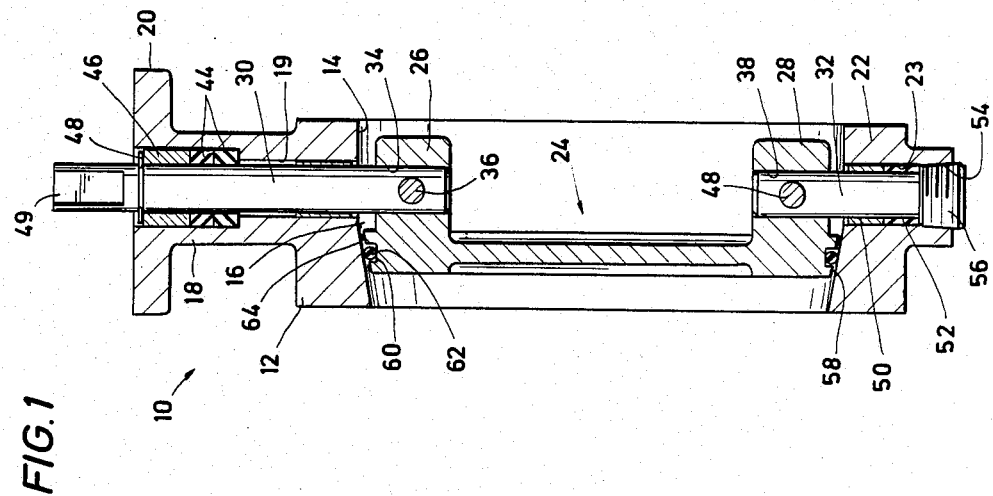

FIREPROOF VALVE ASSEMBLY AND SEAL ELEMENT FOR USE THEREIN

BACKGROUND OF THE INVENTION

1. Field of the Invention

The present invention relates to rotary valves, that is, valves in which a rotatable closure element is mounted in a flowway defined by the valve body so that it may be rotated between open and closed positions to control flow of fluids through the flowway and to seals used therein.

2. Description of the Background

Rotary valves, such as butterfly or disk valves, ball valves, plug valves, globe valves and the like, are used in numerous industrial and military environments. In a typical rotary valve assembly, the valve body defines a fluid flowway and a cavity in which the valve element is disposed. There is also a suitable sealing assembly disposed in the valve cavity such that sealing between the valve body and the valve element can be effected to thereby prevent the flow of fluid through the valve when the valve is in the closed position. The sealing assembly used in many rotary valves is conventionally of an elastomeric and/or polymeric material although there are rotary valves which employ metallic seals and metal-to-metal contact to effect sealing. Indeed, valves which are in environments subject to fire or intense heat, which would virtually destroy a valve seat of an elastomeric or polymeric material, generally are provided with valve seals which are either composite in nature in the sense that there is a primary sealing section of a polymeric material and a secondary or backup sealing section of metal. Thus, in the event that polymeric sealing section acts to effectively seal flow through the valve.

Although rotary valves employing only metallic seats do not suffer the disadvantages of having the seats destroyed when the valve is subjected to a fire or extremely intense heat, they suffer from certain infirmities. For one, fluid-tight sealing between a metal valve element and a metal seal is more difficult to achieve than sealing between a metal valve element and a resilient seal made of a polymeric material. Additionally, metallic seals are much more expensive to manufacture, present difficulties in installation and often times are subject to chemical attack by fluids flowing through the valve. Another problem with certain types of rotary valves employing metallic seals is that they present machining problems in that highly controlled tolerances must be maintained in order for the valve element and the valve seal to cooperate in effecting complete shutoff of flow through the valve.

Even in cases where metallic seals are employed in so-called fire-safe valves, it occasionally happens that the metallic seals, because they are constructed of very thin material, will distort under prolonged intense heat with the result that the valve will fail.

SUMMARY OF THE INVENTION

It is therefore an object of the present invention to provide a rotary valve assembly which is fire safe.

Yet a further object of the present invention is to provide a rotary valve having an annular seal to comprise a heat activated material which can effect sealing between the valve body and the valve element when the valve is subjected to sufficient elevated temperature and/or fire.

Still a further object of the present invention is to provide a seal for use in a rotary valve assembly which incorporates an auxiliary, heat activated material which can effect fluid-tight sealing between the valve element and the valve housing in the event of failure of the primary valve seal material caused by heat or fire.

The above and other objects of the present invention will become apparent from the drawings, the description given herein and the appended claims.

In accord with one aspect of the present invention there is provided an annular seal for use in a rotary valve assembly, the assembly including a valve housing which defines a cavity for receiving a valve element to control the flow of fluid through the valve housing. An annular seal used to effect a seal between the valve element and the valve housing is comprised of a heat-activated or intumescent material which is heat responsive such that it can expand and form a fluid seal between the valve element and the housing in the event the valve assembly is subjected to high temperatures or fire which destroys the primary seal material, usually a polymeric or plastic material, or in the case of a metallic seal, deforms such seal to the extent that its sealing capabilities are impaired.

In another aspect of the present invention, there is provided a valve assembly which includes a valve housing defining an internal valve cavity, the valve housing further including a fluid flow passageway. A valve element is rotatably received in the valve cavity to control fluid flow through the flow passageway. A seating surface is defined on at least one of the valve housing or the valve element while the other of the valve housing or the valve element defines a seal carrying surface. The assembly further includes an annular seal carried on the seal carrying surface on one of the valve housing or the valve element for engaging the seating surface and effecting a seal between the valve housing and the valve element. The seal is comprised of a heat-activated or intumescent material.

BRIEF DESCRIPTION OF THE DRAWINGS

The present invention is illustrated by reference to the drawings in which:

FIG. 1 is a longitudinal view, partly in section, of a disk valve assembly according to the present invention and showing the disk in the closed position;

FIG. 2 is an elevational view taken at right angles to FIG. 1;

DESCRIPTION OF THE PREFERRED EMBODIMENT

Figure 3:
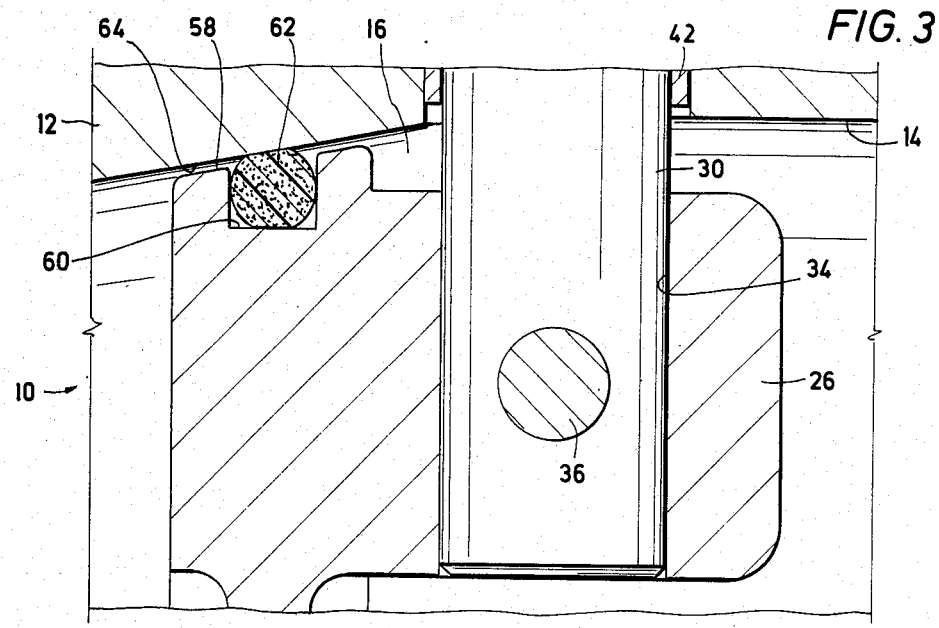
FIG. 3 is an enlarged, detailed, sectional view showing the peripheral edge of the disk valve element, the seal and the seating surface of the valve shown in FIGS. 1 and 2.

While the present invention will be described with particular reference to a butterfly or disk valve assembly, it is to be understood that it is not so limited. The valve assembly seal described herein may be employed in any valve assembly having a rotatable valve closure element such as, for example, a ball valve, a plug valve, a globe valve, etc. wherein an annular seal is employed to seal between the valve element and the valve body.

Referring first to FIG. 1, there is shown a butterfly valve 10 having a generally annular housing 12 with a fluid flow passageway 14 therethrough. Housing 12 also defines a cavity 16, in open communication with passageway 14, for receipt of a valve element described hereafter. The valve housing 12 is typically adapted for positioning between opposed pipe flanges (not shown). Extending outwardly from valve housing 12 is a cylindrical neck 18 formed integrally with housing 12, neck 18 having a cylindrical bore 19 communicating with valve cavity 16. A circular flange 20 formed integrally with neck 18 provides a means for securing an actuator (not shown) to valve 10. Diametrically opposite neck 18, protruding from and integral with housing 12 is a boss 22 having a cylindrical bore 23 in open communication with valve cavity 16.

Pivotally supported in valve cavity 16 is a fluid control disk shown generally as 24 having first and second hubs 26 and 28, respectively. Disk 24 is supported in valve cavity 16 by means of upper and lower shafts 30 and 32 received in bore 19 of neck 18 and bore 23 of boss 22, respectively. Shaft 30 extends into valve cavity 16 and is received in a bore 34 in hub 26. A dowel pin 36 secures shaft 30 to hub 26. In like manner, shaft 32 extends into valve cavity 16 and is received in a bore 38 in hub 28, shaft 32 being pinned to hub 28 by means of dowel pin 40.

Shaft 30 is rotatably journaled in bore 19 by means of bushing 42. Fluids are prevented from escaping valve 10 through bore 19 by means of packing rings 44 which are held in position by means of a packing gland 46. A keeper ring 48 serves to hold packing gland 46 in bore 19.

Shaft 32 is journaled in bore 33 by means of a bushing 50, packing rings 52 serving to prevent leakage from valve 10 through bore 23. Bore 23 is counterbored and tapped as at 54 and receives a threaded plug 56 to thereby close bore 23.

The upper end of shaft 30 protrudes above circular flange 20 and is provided with opposed flats 49 to provide a means for securing a hand wheel, wrench or other device such as an actuator, for rotating shaft 30 and hence disk 24 to effect opening and closing of valve 10.

Disk 24 has an annularly extending peripheral surface 58, surface 58 further including an annularly extending radially outwardly opening groove 60 in which is received an annular seal ring 62 in the form of an O-ring. Seal ring 62 cooperates a generally conical seating surface 64, interiorly of valve housing 12 to effect a seal between valve housing 12 and disk 24. It can thus be seen that when the valve is closed, as in the position shown in FIG. 1, seal ring 62 is in interference contact with seating surface 64 and fluid flow through flowway 14 is effectively prevented.

Referring now to FIG. 3, there is shown an enlargement of a portion of the peripheral edge of the disk 24, the seal ring 62 and the seating surface 64 in the valve body 12. FIG. 3 shows the valve in a normal state, i.e. without having been subjected to intense heat or fire. In this state, seal ring 62 is in sealing engagement with seating surface 64 and the surfaceforming groove 60, thus preventing any fluid leakage through valve assembly 10. As more fully described hereafter, seal ring 62 is comprised, at least partly, of an intumescent material.

Figure 4:
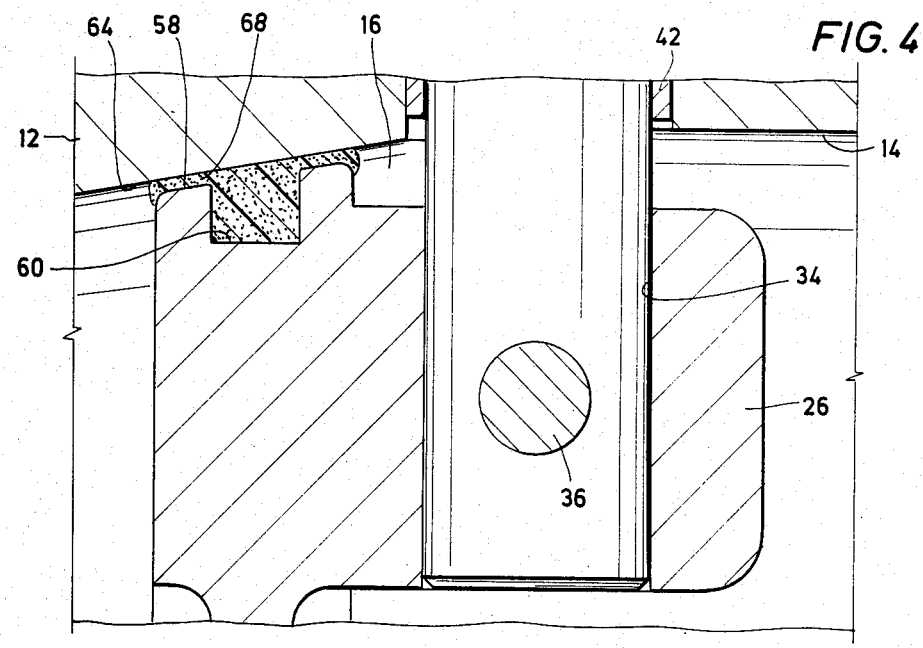
FIG. 4 is a view similar to FIG. 3 showing the valve assembly after being subjected to heat or fire sufficient to cause the seal to intumesce.

Reference is now made to FIG. 4 which shows valve 10 after having been subjected to heat or fire sufficient to at least partially cause seal ring 62 to intumesce. As seen, seal ring 62 has expanded so as to completely fill groove 60. In addition, the material of seal ring 62 has, in effect, been extended into the space between disk edge or surface 58 and seating surface 64, thereby maintaining a fluid-tight seal through valve 10. It will be appreciated that if seal ring 62 was made only of conventional materials, such as polymeric or plastic materials, e.g. rubbers, fluorinated hydrocarbon polymers, etc., and if subjected to sufficient heat, the seal ring 62 would be destroyed or at least lose sufficient structural integrity to permit leakage between the disk edge and the valve body. However, because of the presence of the intumescing seal ring 62, which has expanded because of being subjected to heat or fire, there is a bridging or auxiliary seal 68 formed between seating surface 64 and disk 24.

As noted above, seal ring 62 is comprised of an intumescent material. The term "intumescent material," as used herein, refers to a material or substance which will enlarge, swell or expand under the influence of sufficient heat to form or aid in forming a bridging seal or barrier to prevent fluid flow. Such intumescent materials are comprised of various composites employing materials such as ceramic fibers, asbestos, metallic fibers, aramid fibers, vermiculite and other mineral substances, neoprene rubber and other synthetic materials or polymers, and expanding granules as well as other ingredients which can be made flexible and may expand up to ten times their original volume when exposed to high temperatures, e.g. above 250° F. A typical example of such intumescent or heat-reactive substances are a series of heat-reactive materials known as INTERAM and marketed by 3M.

Generally speaking, the seal ring will be comprised of an intumescent material and a polymeric or plastic material which is ordinarily used to form seal rings for rotary valves. Thus, a mixture of an intumescent material and a rubber, a fluorinated hydrocarbon polymer or the like, formed into a generally homogeneous mixture wherein the intumescent material is uniformly dispersed throughout the polymeric matrix will be employed. When such a homogeneous composite of intumescent material and a polymeric or plastic material is employed in forming the seal of the present invention, the percentage of each such component or of the individual materials forming each component will vary depending upon the service in which the valve is placed, e.g. pressures, temperatures, chemical environments, etc. In general, it is only necessary that when the seal ring is formed in a composite manner wherein the intumescent material and the polymeric or plastic material are formed in a generally homogeneous mixture, that there be sufficient polymeric or plastic material to ensure fluid-tight sealing under normal operating conditions of the valve, i.e. when not subjected to heat or fire sufficient to destroy such polymeric or plastic material.

While, as described above, the seal can conveniently be made as a homogeneous mixture of intumescent material and polymeric or plastic material, the seal can also be constructed as a multi-piece composite seal in the form of a metallic sealing portion and an intumescent portion. There are many instances in which thin metallic seal rings are employed in various rotary valve assemblies, particularly in fire-safe valves, sealing being accomplished by metal-to-metal interference fit between the seating surface and the metallic seal member. While such metallic seals are generally fire resistant, in many cases the metal seal ring is, of necessity, quite thin so as to permit sufficient flexure and ensure sealing. In these cases, the thin metal seal ring may well deform under intense heat providing a leakage path through the valve. The presence of the auxiliary intumescent seal material will act, in a manner similar to that described above, to expand and fill any gaps between the metallic seal ring and the seating surface which may be formed by deformation of the thin metal seal ring.

Figure 5:
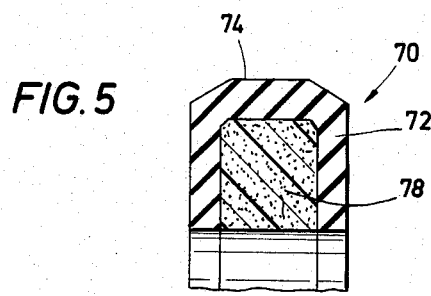
FIG. 5 is a cross-sectional view of one form of seal in accordance with the present invention.

The seal ring may also be made in other composite forms in which there is generally an outer layer of a polymeric or plastic material which encapsulates or partially encapsulates a core of intumescent material. Reference is now made to FIG. 5 for a typical annular seal member 70 which could be used in a disk valve. As can be seen, seal member 70 has a body portion 72 formed of a polymeric or plastic material or some other similar resilient material which defines an annularly extending, radially inward sealing surface 74 which is generally in the form of a trapezoid when viewed in transverse cross section. Body 72 is provided with an annularly extending, radially outwardly opening groove 76 which is filled with an intumescent material 78. It will be apparent that if seal member 70 were in a valve which was subjected to sufficient fire or heat to destroy or partially destroy, or at least deleteriously affect the structural integrity of body member 72 such that it could not effect a fluid-tight seal, intumescent material 78 would expand or extrude under the influence of such fire or heat and fill any gaps between the seating surface and the destroyed or deformed portion of body 72.

Figure 6:
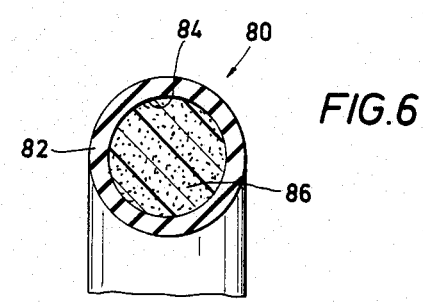
FIG. 6 is a view, similar to FIG. 5 and showing yet another form of seal in accordance with the present invention.

FIG. 6 shows yet another embodiment of the seal member of the present invention which is in the form of an O-ring, similar to seal ring 62 described above. Seal ring 80 includes a body 82 in the form of a toroid providing an annular core space 84 in which is received an intumescent material 86, intumescent material 86 substantially filling core space 84. In like manner as described with respect to seal member 70, it will be seen that if the outer sheath or covering 82 of seal member 80 is destroyed by fire or heat, intumescent material 86 will expand or extrude sufficient to fill the void between the seating surface of the valve and the disk or valve element thereby providing a fluid-tight seal.

With respect to the seal members shown in FIGS. 5 and 6 above, body portions 72 and 82 can be formed of any plastic, polymeric or resilient material as described above and which are conventionally used in forming seals for disk or other rotary valves. While the invention has been described with respect to a butterfly or disk valve in which the seal member is carried by the disk, it is well known that many butterfly valves employ resilient or polymeric seals which are received in a groove internally of the body, sealing being accomplished by an interference fit between the peripheral edge of a metallic disk and the rubber or polymeric seal carried by the valve housing. In such cases, the intumescent material can be incorporated, in any of the manners described above, into the seal carried by the valve housing as opposed to the seal carried by the disk or valve element.

While, as noted above, the invention has been described above with particular reference to a butterfly or disk valve, it will be apparent that the invention is not so limited. For example, in the case of ball valves, particularly of the floating type, wherein the ball valve element floats in a valve cavity under the action of line pressure to engage annular seal rings carried by the valve body, the seal rings could be comprised, in any of the manners described above, of an intumescent material such that if the ball valve were subjected to fire or heat, the seal rings would intumesce thereby forming a bridging seal or barrier to prevent fluid flow through the valve. In like manner, the invention can be utilized in globe valves or other such rotary valve assemblies. In general, the present invention is applicable to any valve assembly wherein a valve element is movable from a first position in which the valve is opened to a second position in which the valve is closed and in which the valve includes a surrounding, usually annular, seal which is normally heat or fire destructable, e.g. a polymeric seal, or deformable, e.g. a thin metal seat.

The materials of construction of the intumescent material will depend upon the application to which the valve is put. It is only necessary that the material forming the intumescent portion of the seal have a structure, when expanded, so as to be able to withstand fluid pressure to thereby effect a seal between the valve element and the valve body.

While the present invention finds particular utility with valve assemblies which utilize resilient seals such as seal rings made of rubber, polymers, both natural and synthetic, fluorocarbon resins and the like, it also has application in valves which employ metallic seats which are thin and subject to deformation under heat or fire, whereby such metallic seats lose their integrity and shape and permit leakage of fluid through the valve.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. A valve assembly comprising:
   a valve housing, said valve housing defining an internal valve cavity, said valve housing further including a fluid flow passageway;
   a valve element rotatably received in said valve cavity to control flow through said flow passageway;
   one of said valve housing or said valve element defining an annular seating surface, the other of said valve housing or said valve element defining an annular seal carrying surface; and
   an annular seal carried on said seal carrying surface on one of said valve housing or said valve element for engaging said seating surface and effecting a seal between said valve housing and said valve element, said seal including an intumescent material.

2. The valve assembly of claim 1 wherein said valve element comprises a disk valve element.

3. The valve assembly of claim 2 wherein said disk valve element includes a peripheral edge surface, said peripheral edge surface including a radially outwardly opening, annularly extending, groove, said seal being received in said groove.

4. The valve assembly of claim 1 wherein said seating surface is on said valve housing in generally surrounding relationship to said flow passageway.

5. The valve assembly of claim 1 wherein said seal comprises a generally homogeneous mixture of a polymeric material and said intumescent material.

6. The valve assembly of claim 5 wherein said seal comprises an O-ring.

7. The valve assembly of claim 1 wherein said seal includes a central core of said intumescent material and an outer covering of a polymeric material.

8. The valve assembly of claim 7 wherein said seal comprises an O-ring.

9. The valve assembly of claim 1 wherein said seal includes an annular polymeric body section defining an annular, radially outwardly opening groove and an intumescent material disposed in said groove.

10. A seal for use in a rotary valve assembly having a valve housing defining a cavity for receiving a rotatable valve element, said seal effecting sealing between said valve element and said valve housing, said seal comprising an annular body comprised of an intumescent material and a sealing material.

11. The seal of claim 10 wherein said body is comprises of a generally homogeneous mixture of a polymeric material and said intumescent material.

12. The seal of claim 10 wherein said body comprises an O-ring.

13. The seal of claim 10 wherein said body comprises a central core of said intumescent material and an outer covering of a polymeric material.

14. The seal of claim 13 wherein said body comprises an O-ring.

15. The seal of claim 10 wherein said body comprises a polymeric section defining an annular, radially outwardly opening groove and an intumescent material disposed in said groove.

* * * * *

REEXAMINATION CERTIFICATE (1687th)
United States Patent [19]
Scobie et al.

[11] B1 4,649,949
[45] Certificate Issued  Apr. 28, 1992

[54] FIREPROOF VALVE ASSEMBLY AND SEAL ELEMENT FOR USE THEREIN

[75] Inventors: William B. Scobie; Michael L. Wagberg, both of Houston, Tex.

[73] Assignee: Keystone International Holdings Corp., Houston, Tex.

Reexamination Request:
  No. 90/002,387, Jul. 16, 1991

Reexamination Certificate for:
  Patent No.: 4,649,949
  Issued: Mar. 17, 1987
  Appl. No.: 836,542
  Filed: Mar. 5, 1986

[51] Int. Cl.⁵ .................................. F16K 17/14
[52] U.S. Cl. ............................. 137/67; 137/74; 251/306; 251/317
[58] Field of Search ............. 251/306, 308, 316, 317; 137/67, 72, 74, 75

[56] References Cited
U.S. PATENT DOCUMENTS

| | | | |
|---|---|---|---|
| 4,267,853 | 5/1981 | Yamaguchi et al. | 137/67 |
| 4,273,879 | 6/1981 | Langer | 521/91 |
| 4,373,542 | 2/1983 | Scaramucci | 137/72 |
| 4,533,114 | 8/1985 | Cory et al. | 251/67 |
| 4,582,080 | 4/1986 | Stock | 137/74 |

FOREIGN PATENT DOCUMENTS 2182291 11/1973 France.

OTHER PUBLICATIONS

Brochure entitled "Fire Barrier—3M" (1984).
5-Page packet of advertising materials entitled "Interam ® Brand Heat Reactive Materials—3M" (undated).

Primary Examiner—Alan Cohan

[57] ABSTRACT

A valve assembly comprising a valve housing defining an internal valve cavity and a fluid flow passageway, a valve element rotatably received in the valve cavity to control flow through the passageway, one of the valve housing or the valve element defining a seating surface, the other defining a seal member carrying surface, and a seal member carried on the seal member carrying surface on either the valve housing or the valve element for engaging the seating surface and effecting a seal between the valve using the valve element, the seal member being comprised of an intumescent material.

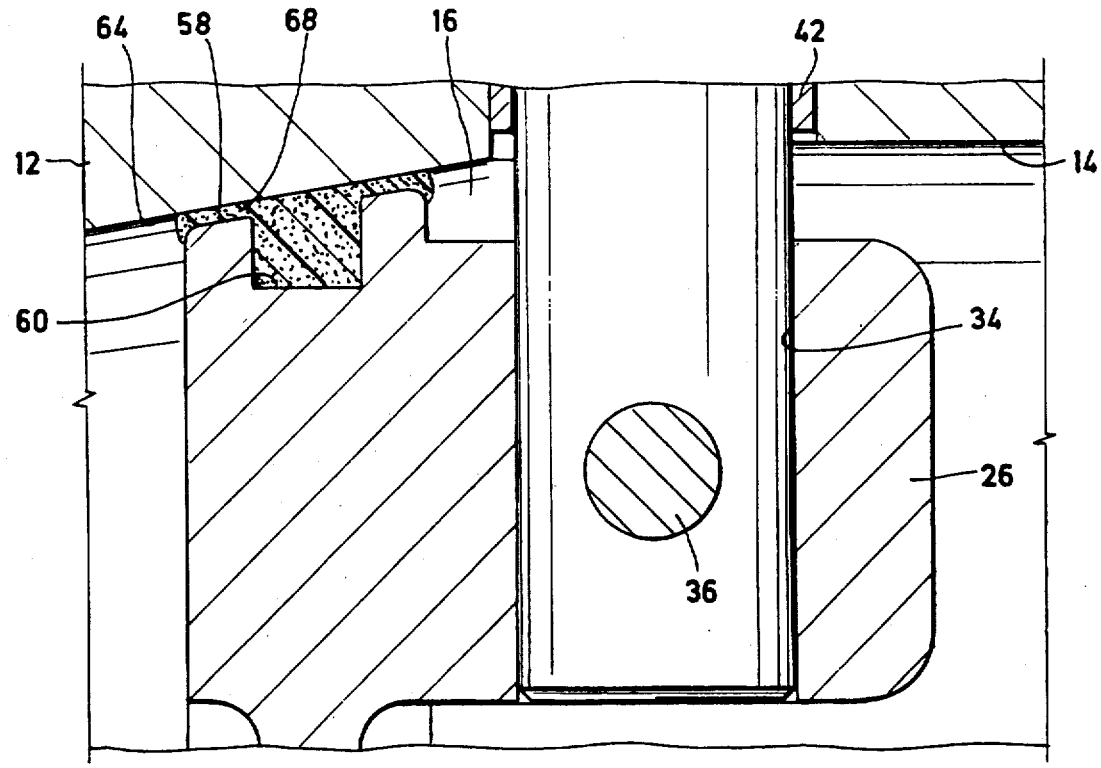

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, lines 14-36:

The seal ring may also be made in other composite forms in which there is generally an outer layer of a polymeric or plastic material which encapsulates or partially encapsulates a core of intumescent material. Reference is now made to FIG. 5 for a typical annular seal member 70 which could be used in a disk valve. As can be seen, seal member 70 has a body portion 72 formed of a polymeric or plastic material or some other similar resilient material which defines an annularly extending, radially [inward] *outward* sealing surface 74 which is generally in the form of a trapezoid when viewed in transverse cross section. Body 72 is provided with an annularly extending, radially [outwardly] *inwardly* opening groove 76 which is filled with an intumescent material 78. It will be apparent that if seal member 70 were in a valve which was subjected to sufficient fire or heat to destroy or partially destroy, or at least deleteriously affect the structural integrity of body member 72 such that it could not effect a fluid-tight seal, intumescent material 78 would expand or extrude under the influence of such fire or heat and fill any gaps between the seating surface and the destroyed or deformed portion of body 72.

AS A RESULT OF REEXAMINATION, IT HAS BEEN DETERMINED THAT:

Claims 1, 9, 10 and 15 are determined to be patentable as amended.

Claims 2-8 and 11-14, dependent on an amended claim, are determined to be patentable.

New claims 16-26 are added and determined to be patentable.

1. A valve assembly comprising:
a valve housing, said valve housing defining an internal valve cavity, said valve housing further including a fluid flow passageway;
a valve element rotatably received in said valve cavity to control flow through said flow passageway;
one of said valve housing or said valve element defining an annular seating surface, the other of said valve housing or said valve element defining an annular seal carrying surface; and
an annular seal carried on said seal carrying surface on one of said valve housing or said valve element for engaging said seating surface and effecting a seal between said valve housing and said valve element *when said valve element is closed and said valve assembly is subject to normal operating temperatures*, said seal including an intumescent material and a resilient material, *and forming an essentially solid structure prior to the valve assembly being subjected to high temperatures.*

9. The valve assembly of claim 1 wherein said seal includes an annular polymeric body section defining an annular, radially [outwardly] *inwardly* opening groove and an intumescent material disposed in said groove.

10. A seal for use in a rotary valve assembly having a valve housing defining a cavity for receiving a rotatable valve element, said seal effecting sealing between said valve element and said valve housing *when said valve element is closed and said seal is subject to normal operating temperatures*, said seal comprising an annular body comprised of an intumescent material and a *resilient* sealing material, *said annular body forming an essentially solid structure prior to the seal being subject to high temperatures.*

15. The seal of claim 10 wherein said body comprises a polymeric section defining an annular, radially [outwardly] *inwardly* opening groove and an intumescent material disposed in said groove.

*16. A valve assembly for controlling flow of pressurized fluid, comprising:*
*a valve housing, said valve housing defining an internal valve cavity, a fluid flow passageway, and a bore extending through said housing to said valve cavity;*
*a valve element rotatably received in said valve cavity to control flow through said flow passageway;*
*a valve stem connected to said valve element, said valve stem extending through said bore and from said housing for rotating said valve element within said valve cavity;*
*a valve stem seal for fluid-tight sealing between said valve stem and said housing to prevent escape of pressurized fluid through said bore;*
*one of said valve housing or said valve element defining an annular seating surface, the other of said valve housing or said valve element defining an annular seal carrying surface; and*
*an annular flow control seal carried on said seal carrying surface on one of said valve housing or said valve element for engaging said seating surface and effecting a seal between said valve housing and valve element, said flow control seal including an outer sealing surface for sealing engagement with said seating surface and an intumescent material for expanding into sealing engagement with both said valve element and said seating surface when subject to high temperature.*

*17. The valve assembly of claim 16, comprising:*
*said intumescent material being positioned with respect to said sealing surface for resiliently opposing movement of said outer sealing surface away from said seating surface to maintain sealing engagement of said sealing surface and said seating surface when said flow control seal is subject to pressurized fluid.*

*18. The valve assembly of claim 17, wherein said annular flow control seal forms an essentially solid structure.*

*19. The valve assembly of claim 17, further comprising:*
*said flow control seal including a polymeric material outer layer for forming said sealing surface, and said intumescent material being positioned inwardly of and in physical engagement with said outer layer.*

20. The valve assembly of claim 16, wherein said fluid passageway has a central axis, and said valve stem has a stem axis substantially perpendicular to said central axis.

21. The valve assembly of claim 16, wherein said intumescent material comprises a generally homogeneous mixture including a component selected from a group consisting of a polymeric material and a plastic material.

22. A valve assembly for positioning along a flowline to control fluid flow under line pressure through the flowline comprising:

a valve housing, said valve housing defining an internal valve cavity, said valve housing further including a fluid flow passageway for communication with the flowline and having a flow axis;

a valve element rotatably received in said valve cavity to control flow through said flow passageway;

one of said valve housing or said valve element defining an annular seating surface, the other of said valve housing or said valve element defining an annular seal carrying surface;

an annular seal carried on said seal carrying surface on one of said valve housing or said valve element and including a resilient material outer layer for forming a sealing surface to engage said seating surface and effect a seal between said valve housing and said valve element under normal valve assembly operating conditions; and said annular seal further including an intumescent material in physical engagement with said outer layer and radially spaced between said sealing surface and said seal carrying surface for resiliently opposing movement of said sealing surface away from said seating surface under normal valve assembly conditions, said intumescent material expanding for engagement with said seating surface when said valve assembly is subject to high temperature.

23. The valve assembly of claim 22 wherein said valve element includes a peripheral edge surface, said peripheral edge surface including a radially outwardly opening, annularly extending groove, and said seal being received in said groove.

24. The valve assembly of claim 22 wherein said seal includes a central core of said intumescent material and said resilient material outer layer forms an outer covering of a polymeric material.

25. The valve assembly of claim 22 wherein said seal forms an essentially solid structure prior to the valve assembly being subject to high temperatures.

26. The valve assembly of claim 22, wherein said intumescent material comprises a generally homogeneous mixture including a component selected from a group consisting of a polymeric material and a plastic material.

* * * * *